(12) United States Patent
Weaver et al.

(10) Patent No.: US 7,969,075 B2
(45) Date of Patent: Jun. 28, 2011

(54) THERMAL STORAGE SYSTEM USING ENCAPSULATED PHASE CHANGE MATERIALS IN LED LAMPS

(75) Inventors: Matthew Weaver, Aptos, CA (US);
James Kingman, Woodside, CA (US);
Sanjoy Ghose, Scotts Valley, CA (US)

(73) Assignee: Lumenetix, Inc., Scotts Valley, CA (US)

( * ) Notice: Subject to any disclaimer, the term of this patent is extended or adjusted under 35 U.S.C. 154(b) by 177 days.

(21) Appl. No.: 12/368,936

(22) Filed: Feb. 10, 2009

(65) Prior Publication Data

US 2010/0201241 A1    Aug. 12, 2010

(51) Int. Cl.
*H01K 1/58* (2006.01)
*F28D 15/00* (2006.01)

(52) U.S. Cl. .................................... 313/46; 165/104.21

(58) Field of Classification Search ......... 165/104.21–104.27; 313/46, 11, 313/12, 22–26, 34–36
See application file for complete search history.

(56) References Cited

U.S. PATENT DOCUMENTS

| | | | | |
|---|---|---|---|---|
| 4,237,023 A * | 12/1980 | Johnson et al. | ................... | 252/70 |
| 4,504,402 A * | 3/1985 | Chen et al. | ................... | 252/70 |
| 4,581,285 A * | 4/1986 | Mahefkey, Jr. | ............... | 442/378 |
| 5,315,154 A * | 5/1994 | Elwell | ........................... | 257/707 |
| 5,722,482 A * | 3/1998 | Buckley | ........................... | 165/10 |
| 6,452,217 B1 | 9/2002 | Wojnarowski et al. | | |
| 6,482,332 B1 * | 11/2002 | Malach | ........................... | 252/70 |
| 7,252,140 B2 | 8/2007 | Glezer et al. | | |
| 7,810,965 B2 | 10/2010 | Weaver | | |
| 2002/0033247 A1 * | 3/2002 | Neuschutz et al. | ............. | 165/10 |
| 2002/0147242 A1 * | 10/2002 | Salyer et al. | .................... | 521/50 |
| 2004/0057234 A1 * | 3/2004 | Mohacsi | ......................... | 362/231 |
| 2004/0113044 A1 * | 6/2004 | Ishiguchi | ....................... | 250/205 |
| 2004/0159422 A1 * | 8/2004 | Zuo et al. | ................. | 165/104.14 |
| 2005/0276053 A1 * | 12/2005 | Nortrup et al. | ................ | 362/294 |
| 2006/0086096 A1 * | 4/2006 | Ghoshal | ........................... | 62/3.2 |
| 2006/0151146 A1 | 7/2006 | Chou et al. | | |
| 2007/0114010 A1 | 5/2007 | Upadhya et al. | | |
| 2007/0125522 A1 * | 6/2007 | Stefanoski | ............... | 165/104.21 |

(Continued)

FOREIGN PATENT DOCUMENTS

EP    0612105 A1    8/1994

(Continued)

OTHER PUBLICATIONS

U.S. Appl. No. 12/237,313.*

(Continued)

*Primary Examiner* — Nimeshkumar D Patel
*Assistant Examiner* — Steven Horikoshi
(74) *Attorney, Agent, or Firm* — Perkins Coie LLP (57) ABSTRACT

A phase change material (PCM) is used as thermal storage for lighting systems. The PCM is placed in a thermally conductive container in close contact with the lighting system. As the PCM absorbs heat, it changes from a solid to a liquid state, but the temperature of the PCM is clamped at its melting point temperature. For LED-based systems, the PCM is selected to have a melting point such that the junction temperatures of the LEDs in the system are maintained at approximately their optimum operating temperature inside the lighting system housing. Because the thermal conductivity of the molten PCM is poor, a low thermal resistance heat flow path is provided from the PCM to the container.

8 Claims, 8 Drawing Sheets

U.S. PATENT DOCUMENTS

| | | |
|---|---|---|
| 2007/0230183 A1 | 10/2007 | Shuy |
| 2007/0268694 A1 | 11/2007 | Bailey et al. |
| 2007/0279921 A1 | 12/2007 | Alexander et al. |
| 2008/0094841 A1 | 4/2008 | Dahm |
| 2008/0094850 A1 | 4/2008 | Woodward |
| 2008/0285271 A1 | 11/2008 | Roberge et al. |
| 2009/0021944 A1 | 1/2009 | Lee et al. |

FOREIGN PATENT DOCUMENTS

| | | |
|---|---|---|
| EP | 1717632 A1 | 11/2006 |
| JP | 2002057262 | 2/2002 |
| JP | 2004319658 | 11/2004 |
| JP | 2007080463 | 3/2007 |

OTHER PUBLICATIONS

International Search Report PCT/US2009/069290 dated Jul. 14, 2010, pp. 1-3.
Written Opinion PCT/US2009/069290 dated Jul. 14, 2010, pp. 1-3.
International Search Report PCT/US2009/001253 dated May 27, 2009.
Co-pending U.S. Appl. No. 12/370,521, filed Feb. 12, 2009.
Co-pending U.S. Appl. No. 12/237,313, filed Sep. 24, 2006.
Co-pending U.S. Appl. No. 12/757,793, filed Apr. 9, 2010.
Non-Final Office Action Mailed Jul. 12, 2010 in Co-pending U.S. Appl. No. 12/370,521, filed Feb. 12, 2009.
Written Opinion PCT/US2009/001253 dated May 27, 2009 pp. 1-3.
International Search Report PCT/US2009/001293 dated Oct. 9, 2009 pp. 1-4.
Written Opinion PCT/US2009/001293 dated Oct. 9, 2009 pp. 1-7.
Co-pending U.S. Appl. No. 12/892,696, filed Sep. 28, 2010.
Notice of Allowance Mailed Sep. 1, 2010 in Co-pending U.S. Appl. No. 12/370,521, filed Feb. 12, 2009.

* cited by examiner

THERMAL STORAGE SYSTEM USING ENCAPSULATED PHASE CHANGE MATERIALS IN LED LAMPS

BACKGROUND

A light-emitting diode (LED) is a semiconductor diode that emits incoherent narrow-spectrum light when electrically biased in the forward direction of the p-n junction. LEDs produce more light per watt than incandescent bulbs. LEDs are often used in battery powered or energy-saving devices and are becoming increasingly popular in higher power applications such as flashlights, area lighting, and regular household light sources.

LED performance largely depends on the ambient temperature of its operating environment. Driving the LED hard in high ambient temperatures may result in overheating of the LED package, resulting in poor performance and eventually leading to device failure. Consequently, adequate heat-sinking or cooling is required to maintain a long lifetime for the LED, which is especially important in automotive, medical, and military applications where the LED must operate over a wide range of temperatures and is required to have a low failure rate.

Generally, LED cooling systems rely largely on convective mechanisms to remove heat. Heat convection refers to heat transport by an external source, such as a fan, or heat transfer caused by buoyancy forces resulting from density differences caused by temperature variations in a fluid. The use of passive thermally conductive materials that absorb the heat and slowly rise in temperature would be highly impractical for longer term thermal dissipation. For a non-limiting example, the size of a piece of aluminum needed to cool LEDs used in a typical lighting application for a time span of eight hours or more would be so large that the aluminum would never come to saturation and the LEDs would unacceptably spike up in temperature. The reason is that the volume of the aluminum required to store the heat generated by the LED is beyond the size constraints of the LED bulb envelope, the amount of aluminum required for this application is impractically massive, and aluminum inefficiently facilitates heat convection because it experiences a linear temperature rise proportional to stored heat so that the thermal capacity required for a given LED power level and operating time is very large.

The foregoing examples of the related art and limitations related therewith are intended to be illustrative and not exclusive. Other limitations of the related art will become apparent upon a reading of the specification and a study of the drawings.

SUMMARY

A phase change material (PCM) is used for thermal storage for lighting systems, in particular LED-based lighting systems. The PCM is placed in a container in close contact with the lighting system to be cooled. Because the PCM material may have low thermal conductivity, specific PCM containment geometries should be used to provide sufficient thermal coupling to the lighting system in order to efficiently transfer heat to the PCM mass. A preferred operating temperature of the LED junction is selected to optimize the power output and the lifetime of the LED. The PCM is then selected such that its melting point temperature clamps the LED junction temperature at approximately its selected operating point. Because there are temperature drops between the LED junction and the PCM-based thermal storage system coupled to the lighting system, the melting point temperature of the selected PCM is can be up to tens of degrees higher than the preferred operating temperature the LED junction, Examples of PCMs having appropriate melting point temperatures for lighting systems using LEDs include sodium citrates and sodium phosphates.

When the PCM absorbs heat from the lighting system as a solid, its temperature rises. However, when the PCM reaches its melting point, the temperature of the PCM stays at its melting point temperature until the phase of the PCM changes completely from a solid to a liquid. Then the PCM continues to rise in temperature. Because a PCM can absorb a large amount of heat during its change of phase from a solid to a liquid, the PCM can store a large amount of heat generated by the lighting system while maintaining its temperature at its melting point temperature.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Described in detail below is a method of providing thermal storage for a lighting system, such as an LED-based lighting system. The thermal storage system uses a phase change material to store heat. The term 'thermal storage' refers to bulk or large scale thermal storage that can occur over a time span of several hours or more, where the phase change material stores heat generated during the operation of a lighting system.

Various aspects of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description. Although the diagrams depict components as functionally separate, such depiction is merely for illustrative purposes. It will be apparent to those skilled in the art that the components portrayed in this figure may be arbitrarily combined or divided into separate components.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

Figure 1:
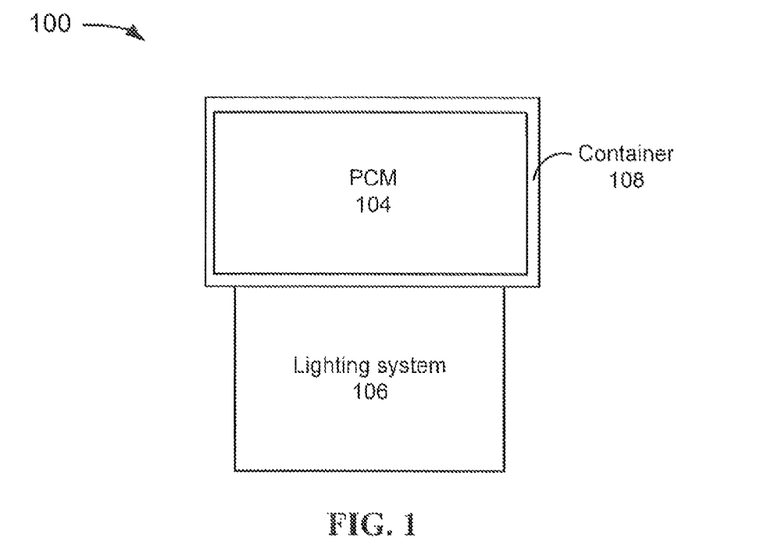
FIG. 1 depicts an example of a thermal storage system that uses a phase change material to provide heat storage for a lighting system.

FIG. 1 depicts a block diagram of a thermal storage system 100 used with lighting applications, but the thermal storage system 100 can be used with any heat-generating device or system that has a preferred operating temperature. In the example of FIG. 1, the system 100 includes a lighting system 106 having one or more lamps and one or more phase change materials 104, enclosed in a sealed, thermally conductive, and non-corrosive container 108. The container 108 and the lighting system 106 are coupled so that the heat generated by the lighting system 106 can be transferred to the PCM 104.

The lighting system 106 may include any type of lighting device including, but not limited to, LEDs used in high intensity lamps such as used with automotive applications or spot lights and LED lamps mounted in enclosed quarters such as within recessed cans.

In the example of FIG. 1, a phase change material (PCM) 104 is used to absorb the heat generated by the lighting system 106. A PCM is a material that has a high latent heat of fusion such that a large amount of heat energy must be applied to change the PCM from a solid to a liquid. At temperatures below and above a PCM's melting point, the PCMs temperature rises as it absorbs heat. However, at the PCM's melting point, the PCM absorbs heat without increasing in temperature until a change of state from solid to liquid of the entire mass has occurred.

Figure 2:
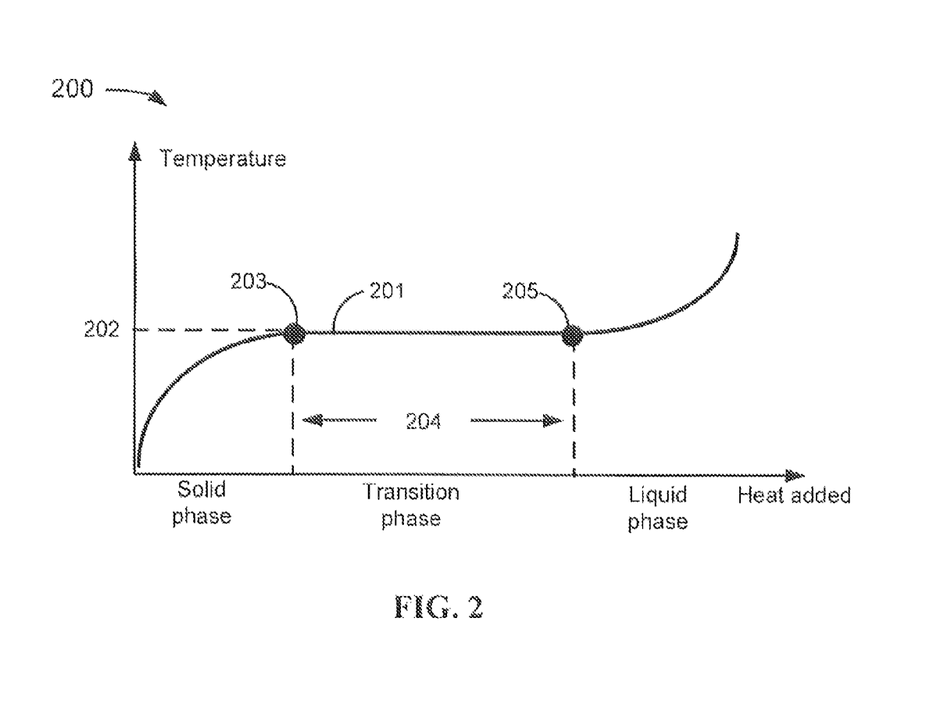
FIG. 2 depicts an example of characteristic temperature changes of a phase change material as heat is added to the material.

FIG. 2 illustrates the characteristic pattern of temperature change of a PCM 104 as heat is added to the PCM over time. At the left side of curve 201, the PCM is in a solid phase. As heat is added to the PCM, we move along the curve 201 toward the right. At point 203 on curve 201, the PCM reaches its melting point temperature 202 and enters a phase transition state 204. The temperature of PCM 104 is clamped at the melting point temperature 202 and continues to absorb heat until the PCM has reached the liquid phase at point 205. As heat continues to be added to the PCM, to the right of point 205, the temperature of the PCM again starts to increase.

A sealed container 108 is used to contain the PCM because the PCM alternates between the solid and liquid states, although there are cases where an unsealed container may also be used. In addition, the PCM has a precise water content, and the container 108 prevents the water in the PCM from dehydrating to the atmosphere. The container 108 should be "gas tight", that is, it tends to be substantially impermeable to gases. In one embodiment, the sealed container 108 is metallic or metallized. In one embodiment the sealed container 108 may be plastic and coated with a metal film for blocking moisture transfer over many years of use. In one embodiment, if the PCM is sealed in a pellet, pouch, or other device within the outside larger container 108, the outside container 108 does not have to be sealed, as discussed below. However, if there is a liquid in addition to the sealed PCM pellets within the container 108, such as discussed with respect to FIG. 9 below, the container 108 would still need to be sealed.

A number of features stem from the thermal storage scheme shown in FIG. 1. Notably, the temperature clamping effect of the PCM 104 effectively clamps its own temperature as well as the temperature of the housing of the lighting system 106 at the melting point temperature 202 until a complete change of phase from solid to liquid has occurred. Because there is a known temperature drop between an LED junction of one or more LEDs operating in the lighting system and the lighting system housing that arises from the design of the structure of the lighting system, clamping the housing temperature effectively clamps the LED junction temperature, where the LED junction temperature is an optimized LED operating temperature. During the clamping period, PCM 104 absorbs all or at least a portion of the heat or energy released by the lighting system 106 while keeping its temperature steady so the lighting system 106 may continue to work within its normal working temperature range. This is especially important for LED-based lighting systems because the available output capacity, efficiency, and life of an LED are highly dependent upon the junction temperature, and the junction temperature can rise if the temperature of the lighting system housing where it is coupled to the thermal storage system rises. Using a PCM for thermal storage allows the output power of an LED to be effectively maximized. Consequently, enormous cost savings may be achieved because the same amount of lighting is generated with approximately half the number of LEDs typically used in conventional implementations within the industry.

In one embodiment, the phase change heat storage capabilities of PCM 104 can be designed to substantially match the typical cyclical usage over time of lighting system 106 in a residential or commercial setting, for example four to 14 hours on and the rest of the time off. The lighting system 106 may be designed to convect away part of the heat energy generated when the system is on, for example half of the generated energy, and to store the remaining portion of heat energy within PCM 104. When the lighting system is off, the heat stored in liquid PCM 104 is slowly released as the state of the material changes back to a solid state. The effective spreading over time of the thermal discharge lowers the peak cooling power requirement of a building and increases the overall building efficiency because less energy is used to cool lighting system 106.

Figure 5:
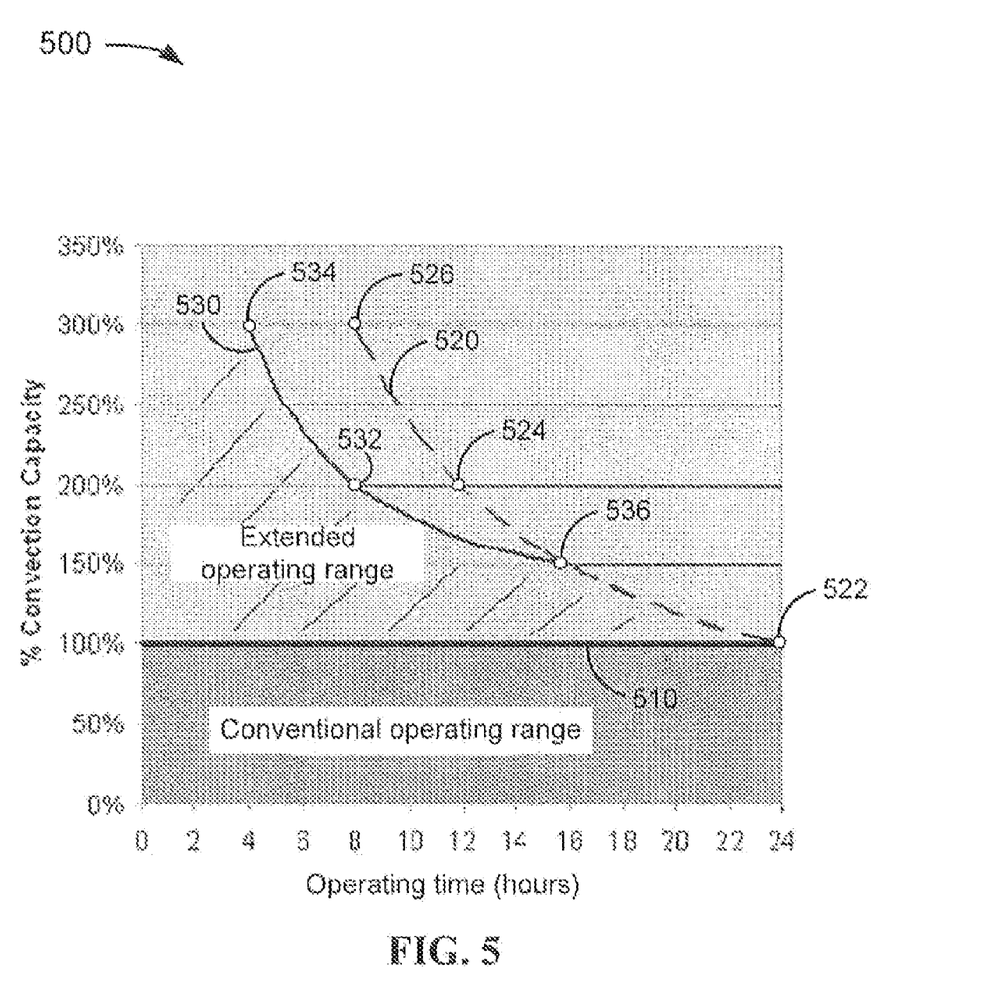
FIG. 5 shows example operating ranges for a convection-based LED lighting system operated continuously, a convection-based LED lighting system operated cyclically, and an LED lighting system that uses phase change material for thermal storage.

FIG. 5 shows a graph 500 of example operating ranges for a convection-based LED lighting system that is continuously operated, and an LED lighting system that uses phase change material for thermal storage for a cyclical application. Curve 510 shows an example of the maximum operating range of a convection-based LED lighting system that is continuously operated. The maximum convection capacity of this pure convection system is referred to as 100% convection capacity and is the baseline against which the other systems are compared. Thus, a reference to 200% convection capacity indicates that the amount of heat energy that can be discharged by a system is twice the amount that could be discharged by the baseline system. The continuously operated system may be operated at any lower power output which requires a lower convection capacity and is shown by the area below curve 510 denoted 'conventional' operating range in graph 500.

Curve 520 shows an example of the maximum operating range of a PCM-based lighting system that uses phase change material for thermal storage for a particular design. The PCM-based lighting system is operated over a fixed duty cycle for a cyclical application over a twenty-four hour period. For the example of 100% duty cycle (point 522 on curve 520), the curve 520 touches curve 510 because the system is operated continuously. For the example of a 50% duty cycle where the lighting system is on continuously for 12 hours out of a 24-hour time period (point 524 on curve 520), the cyclical system would have twice (200%) the convection capacity of the continuously operated PCM-based lighting system because the cyclical system would only operate half the time of the continuously operating system and thus have 12 hours to discharge the absorbed heat energy from the PCM during the off portion of the duty cycle. Similarly, for the example of a 33% duty cycle (point 526 on curve 520), the cyclical system would have three times (300%) the convection capacity of the continuously operated PCM-based lighting system. The cyclically operated system may be operated at any lower power output or lower duty cycle which requires a lower convection capacity and is shown by the area below curve 520 in graph 500.

In practice there may not be enough space in the lamp system to accommodate the volume of PCM required to operate on curve 520. Curve 530 shows an example of the operating range of such a lower volume PCM-based LED lighting system for a with lower capacity than required for curve 520. The design criteria for this example lighting system required the system to have sufficient PCM thermal storage capacity to provide 200% convection capacity during an operational time span of 8 hours (point 532). This same system can provide 300% convection capacity for an operational time span of 4 hours for applications such as a spot light, a garage door opener, a closet, or a restroom (point 534), or 150% convection capacity during an operational time span of 16 hours for applications such as an extended commercial application, street light or retail application (point 536). The lighting system can also be operated at any lower power output or lower duty cycle which requires a lower convection capacity and is shown by the area below curve 530 denoted 'extended operating range' in graph 500.

Note that curves 520 and 530 are examples of curves from a family of curves for PCM-based lighting system designs. Multiple other curves can be graphed corresponding to other lighting system designs.

In one embodiment, a graph similar to graph 500 can be used to present lighting system designs to customers and/or designers. For example, customers and/or designers can define their lighting requirements by specifying maximum operational duty cycles and maximum output power needed, and graphs displaying various available lighting systems designs can be used to help select an appropriate lighting system.

In one embodiment, a graph similar to graph 500 can be used by an electrical system inspector or building inspector to ensure that the lighting system meets applicable electrical code or building safety requirements.

In the example of FIG. 1, when lighting system 106 is used in down light applications, the lighting system 106 is mounted in a recessed can that may retain the heat in the enclosed quarters when a convection-only cooling system is deployed. In this type of application, a PCM 104 in the thermal storage scheme 100 allows full rated performance of lighting system 106 by first diverting the heat generated by the lighting system 106 into PCM 104 over a period of time before discharging the heat from PCM 104 after lighting system 106 is turned off.

Another application of the thermal storage scheme devised in FIG. 1 is the use of high intensity LED lamps for automotive applications with cyclical usage patterns. In this type of application, there is plenty of access to convective cooling when the automobile is moving. When the automobile stops, however, lighting system 106 would burn out in minutes without adequate cooling, dimming, or using an impractically large volume of passive materials for absorbing the heat. With the storage capability of PCM 104, however, the temperature of the lighting system housing and the LED junctions in the lighting system would be clamped at their respective operating temperatures, allowing lighting system 106 to continue to work at full intensity even when the automobile is stopped.

In the example of FIG. 1, a specific and elevated phase change temperature of PCM 104 enables greater average convection when compared to a simple large passive thermal mass that is limited to the same peak temperature. A large passive thermal mass limited to the same peak temperature as PCM 104 will operate at half the peak temperature on average, resulting in roughly half the average convection. Consequently, a simple thermal mass soaks up nearly twice as much heat during the heating cycle and releases heat at half the rate of a comparable PCM 104 limited to the same peak temperature. This distinction is significant in a cyclical application of an LED light source, where the peak junction temperature of the LED must be controlled to maximize the life of the LED and the lumens output by the LED, and the average convection must be maximized in order to maximize the available duty cycle of the LED in cyclical applications.

In the example of FIG. 1, PCM 104 may be an ordinary, low cost, and non-toxic substance, such as certain types of eutectic salts that have a phase change occurring at or near a lighting system housing's preferred operating temperature such that the junction temperature of the LEDs in the system are clamped near an optimum operating temperature. The types of PCM 104 to be used can be determined based on the volume of the material that could be stored in an ordinary lighting system 106 which, when combined with an effective convection scheme with phase changes, will operate for periods consistent with example graph 500 for the associated applications.

In a preferred embodiment, a specific type of PCM 104 can be a eutectic hydrated salt, such as a sodium citrate or a sodium phosphate. Particularly useful are sodium citrates that have a phase transition temperature occurring between approximately 48° C.-58° C. and sodium phosphates that have a phase transition temperature occurring around 70° C. Other salts, such as various nitrates, or paraffins may also be used. However, they may exhibit inferior thermal performance or safety attributes.

In some embodiments, the PCM salts can be combined with specific nucleating agents to minimize super heating and super-cooling. In addition, PCM 104 can also be combined with stabilizing agents to minimize permanent separation/segregation of salt and water components of the PCM during the many cycles of melting and freezing that occur over the lifetime of the lighting system.

One advantage to a PCM-based thermal storage system is that the PCM may be selected such that its melting point clamps the lighting system housing temperature at approximately an operating temperature suitable for clamping the LED junction temperatures at an optimum operating temperature in order to manage temperature-sensitive LEDs. For a non-limiting example, in RGB (red green blue) light mixing applications, the output capacity of the lighting device has been very limited because of the thermal sensitivity of red LEDs. By using the storage scheme 100 with a lower temperature PCM, a red LED can be driven to optimum power. Consequently, the cost of these types of products is lowered for a given output, thus allowing them to enter more mass market applications where the user is not only interested in dimming the lights but also in tuning their color. In some cases, it may also be cost effective to use different types of PCMs with the same lighting system 106 to further tune the capacity of different types of LEDs.

Figure 3:
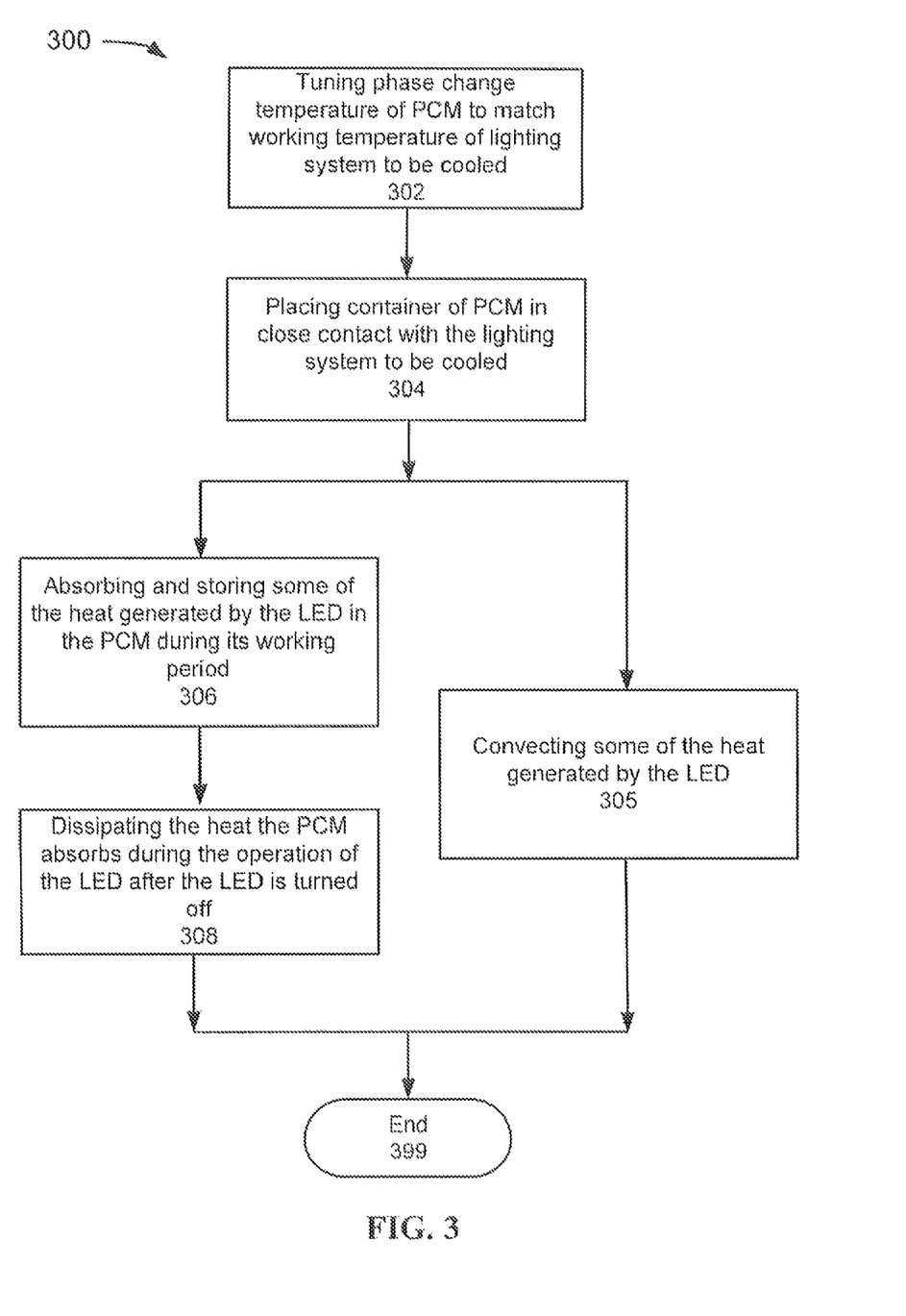
FIG. 3 depicts a flowchart of an example of a process to support thermal storage for LED lighting using phase change material.

FIG. 3 depicts a flowchart 300 of an example of a process for using a phase change material for thermal storage for LED lighting. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

In the example of FIG. 3, the flowchart 300 starts at block 302, where the phase change temperature of a PCM is tuned to substantially match the working temperature of the lighting system to be cooled. Such tuning can be achieved by choosing the appropriate types and/or combinations of materials as well as the addition of nucleating or stabilizing agents as discussed above.

The flowchart 300 continues to block 304 where the container of the PCM is placed in close contact with the lighting system to be cooled.

The flowchart 300 then continues in two parallel paths. In the first path, at block 306, the PCM absorbs and stores at least some of the heat generated by the LED after the lighting source utilizing the LED is turned on. During the heat absorbing process, once the PCM reaches its melting point, the temperature of the PCM remains at a temperature which substantially corresponds to the working temperature of the lighting system housing while the PCM changes its state. Because there is a known temperature drop from the LED junction to the lighting system housing, the PCM melting point should be selected such that the LED does not heat up beyond its ideal working temperature.

The first path of flowchart 300 continues to block 308 where the PCM dissipates the heat it absorbed during the operation of the LED after the lighting system is turned off. The first path of flowchart 300 ends at block 399.

In the second parallel path, block 304 continues to block 305 where some of the heat generated by the LED is convected away either actively or due to temperature gradients between the LED source and the surrounding environment. The second path of flowchart 300 ends at block 399.

Figure 4:
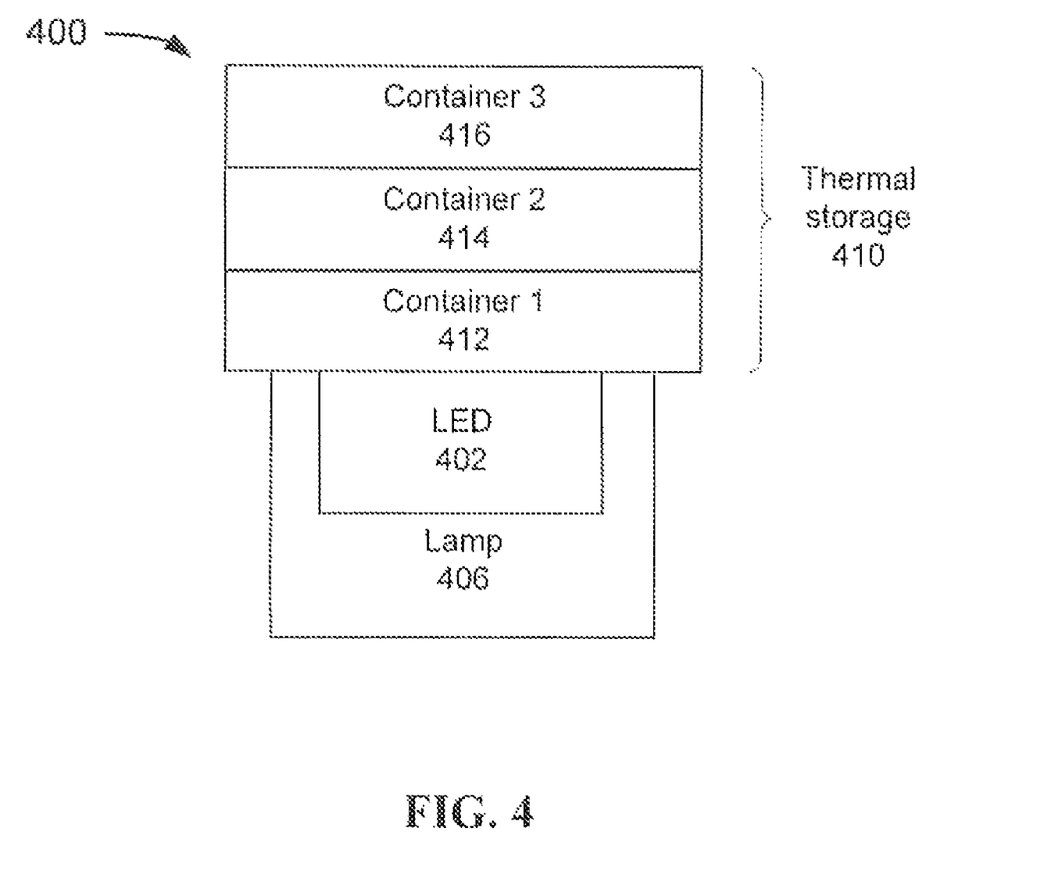
FIG. 4 depicts an example of a system to support thermal storage for LED lighting using phase change material in stacked containers.

FIG. 4 depicts an example of a system 400 that supports thermal storage for LED lighting using stacked layers of phase change material. In the example of FIG. 4, the system 400 includes one or more lamps 406 that utilizes one or more LEDs 402 and thermal storage 410 having multiple stacked containers 412, 414, 416. Three stacked containers are shown in system 400, but it will be apparent to a person skilled in the art that greater or fewer containers may be used. In one embodiment, each stacked container is thermally conductive, sealed, and holds a PCM material. The PCM material in the stacked containers 412, 414, 416 may or may not be the same material, and a PCM material in one container may be a mixture of different types of PCM and/or include nucleating agents and/or stabilizing agents.

PCMs exhibit relatively poor thermal conductivity when compared to metallic conductors. In particular, the thermal conductivity of molten PCM is poor. Consequently, simple bulk volumes of PCMs present unacceptable thermal resistance and an unacceptable temperature gradient through the solid mass as the melt line progresses deeper and deeper into the solid mass. In addition, the height of a volume of PCM should be minimized in order to reduce the gravitational buoyant gradient driving it. Thus, PCM containers 412, 414, 416 are typically not very deep and may resemble a can lid.

In one embodiment, the thermal storage 410 in the system 400 may include a stack of can lids 412, 414, 416, where each can lid is made from a thermally conductive material, and each can lid has a can side. The can sides may take on typical light bulb geometries such as a cylinder or cone shapes. This "stacked can" configuration provides adequate heat conduction through the layers of can lids together with the can sides of the stacked can lids 412, 414, 416. Using such a geometry, the bulk temperature at any location in the PCM in the thermal storage 410 is in close proximity to the source temperature for the heating rates and volumes of interest.

In some embodiments, stacked containers may be produced with traditional automated can fabrication methods of cup forming, deep drawing, and necking (for conical forms) followed by lid forming and sealing. The result is intricate heat spreading geometries suitable to maximize the performance of PCM, created from minimal amounts of inexpensive sheet metal using long-proven automated processes. It is worth noting that containment of PCM is not limited to can fabrication methods described above. Other preferably sheet-metal based containment methods may also be employed. As non-limiting examples, nested progressively smaller cans and/or layers of "corrugated" sheets have also shown to be effective.

Heat sources may be attached to the lid, bottom, or sides or one or more of the cans in a stack of one or more cans. If necessary, additional fin-shaped structures may be embedded into the can volume at the base, sides, or lid depending on the location of heat sources.

In one embodiment, one or more of the containers 412, 414, 416 may contain a non-PCM thermal mass material, for example water, to benefit the overall thermal characteristics of the thermal storage 410 for cooling of LED 402. In terms of per unit mass and in most cases volume too, water exceeds the thermal capacity of all the metals and is dramatically less expensive per unit heat storage than the metals. The same sheet metal techniques necessary to contain PCM are inherently well suited for water containment and heat transfer too. Water in such cans further possesses unique buoyant passive convection flow characteristics, which is lacking in all solid materials and would be inherently exploited for LED cooling in specific recessed ceiling applications.

In some embodiments, alternate layers of solid pancake-shaped PCM solid-state material may be embedded with layers of corrugated metal disks (not shown) progressively filling the volume of within a single can. The embedded metal disks have edge lips that are carefully sized and pressed tightly against the sides of the cans, providing the high thermal flux in the sheet metal layers between can walls and stacked disks.

Because PCM in the liquid state is less thermally conductive than PCM in the solid state, when the PCM absorbs heat and starts to melt, a low resistance thermal heat path should be provided between the thermally conductive container holding the PCM and the PCM in the solid state in order to enable the solid PCM to efficiently absorb heat emitted by the lighting system. In one embodiment, a low resistance thermal heat path is provided through the PCM to the thermally conductive container enclosing the PCM as a direct heat transfer path to the solid PCM. The low resistance heat path should be made from a thermally conductive material and couple the thermally conductive enclosing container directly to the PCM. Some examples of a low resistance heat path are shown in FIGS. 6A-6C.

Figure 6A:
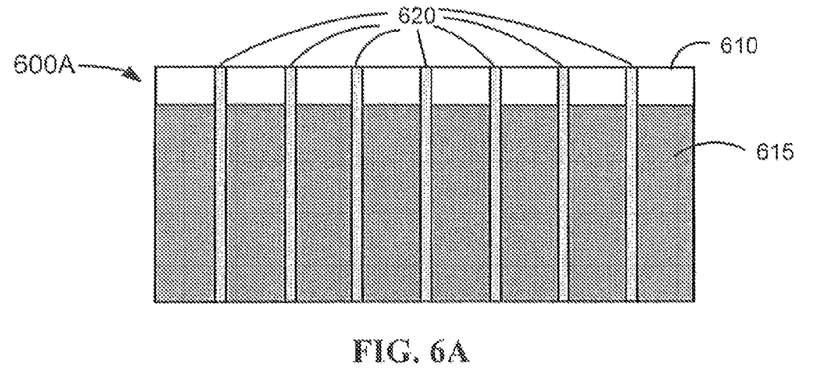
FIGS. 6A-6C depict examples of low resistance heat flow paths to the PCM in a sealed container.
Figure 6B:
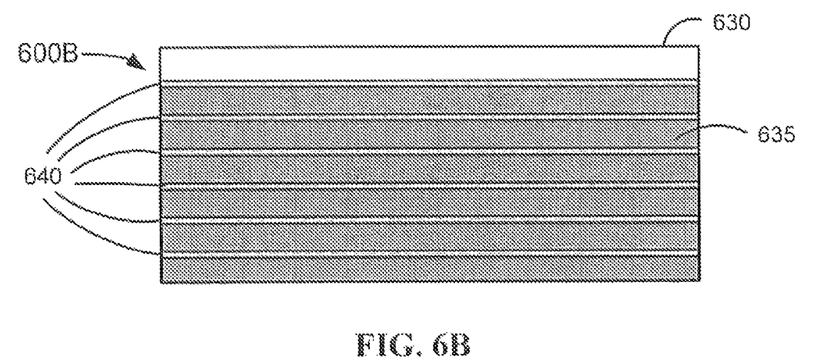
Figure 6C:
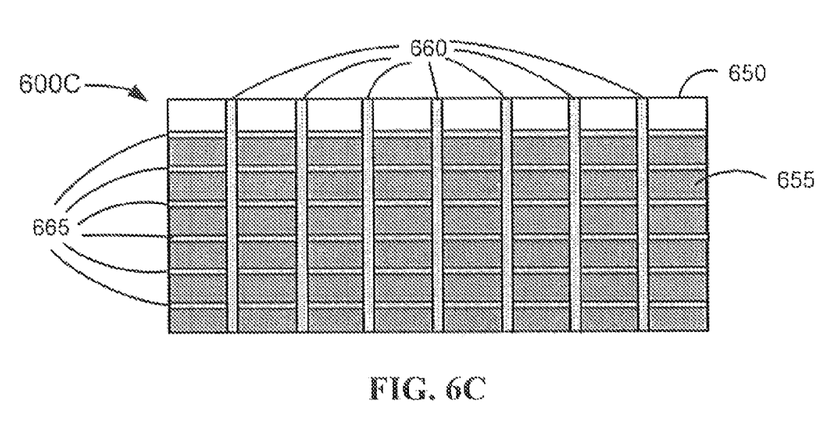

In FIG. 6A, the enclosing thermally conductive container 610 holds PCM 615, and there are thermally conductive vertical fins 620 connecting the top and bottom of the container 610 through the PCM 615. Thus, heat from the LEDs coupled to the container 610 can be transferred efficiently to the PCM 615, even when the PCM has absorbed enough heat to partially melt the PCM. Many different types of heat flow paths can be used. For example, in FIG. 6B thermally conductive horizontal fins 640 are used to conduct heat in to the PCM 635 from the sides of the thermally conductive container 630. And in FIG. 6C both thermally conductive vertical fins 660 and thermally conductive horizontal fins 665 are used to conduct heat in to the PCM 655 from the thermally conductive container 650. The thermally conductive fins can have any shape and size. They can be deployed in any pattern, and any number of fins can be used. Moreover, the fins do not have to cross the entire container holding the PCM. Fins can be provided that couple the container to a mid-portion of the volume holding the PCM. Other thermally conductive structures can be used as the low resistance heat flow path, such as a thermally conductive mesh, lattice, or foam made from a material including, but not limited to, graphite or aluminum.

Figure 7:
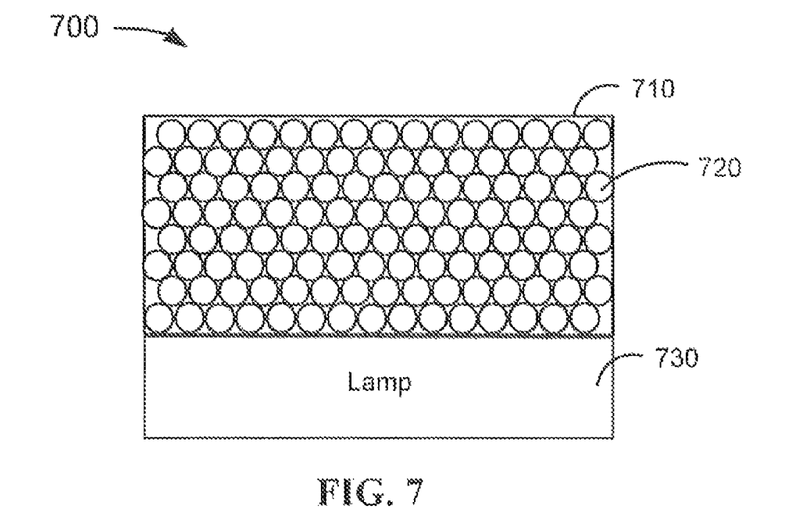
FIG. 7 depicts an example of pelletized PCM capsules having a thermally conductive coating.

In one embodiment, the PCM can be pelletized by encapsulating the PCM in a material with a high thermal conductivity, where the PCM does not totally fill each pellet in order to provide for expansion of the PCM upon heating. Alternatively, if the material used to encapsulate the PCM does not have a sufficiently high thermal conductivity, it can be coated with a thermally conductive coating. The conductive surfaces of the pellets are in close contact, thus providing a high conductivity path to the PCM enclosed within each pellet. The pellets of PCM can be any shape and size. However it is beneficial to maximize the contact area between the pellets in order to have high heat flow; this typically requires pellets having a small diameter. In one embodiment, the pellets have a diameter on the order of approximately 0.1 to 1.0 microns. In one embodiment, the pellets have a diameter on the order of approximately 1.0 microns to 10.0 microns. The small pellet size also provides for a larger fill volume of PCM in the PCM housing so that the heat storage capacity is maximized. The encapsulated pellets can be spherical, ellipsoidal, or any solid shape. The coating of the PCM capsules should be thin, on the order of approximately 0.1 microns or thinner. Capsule coating material includes, but is not limited to, copper, stainless steel, and polymers such as HDPE or PET. Metallic coatings are preferable even though the very thin coating material permits using lower conductivity coatings such as polymers. The coatings can be applied by vapor deposition, electroless plating, or other thin-film application processes. Each pellet should be sealed to prevent leakage of the PCM when heated to the liquid phase.

FIG. 7 shows a cross-section of one configuration where encapsulated PCM is used to provide a low resistance heat flow path. The lighting system is in a housing 730 that is coupled to the thermally conductive PCM housing 710 which holds the pelletized PCM 720. Note that in this example, the PCM pellets are spherical, thus allowing optimal packing of pellets in the PCM housing 710. The PCM pellets should not totally fill the PCM housing 710 in order to provide room for expansion of the pellets when heated. Because the PCM is sealed in the pellets 720, the container 710 holding the pellets does not have to be sealed.

Figure 8:
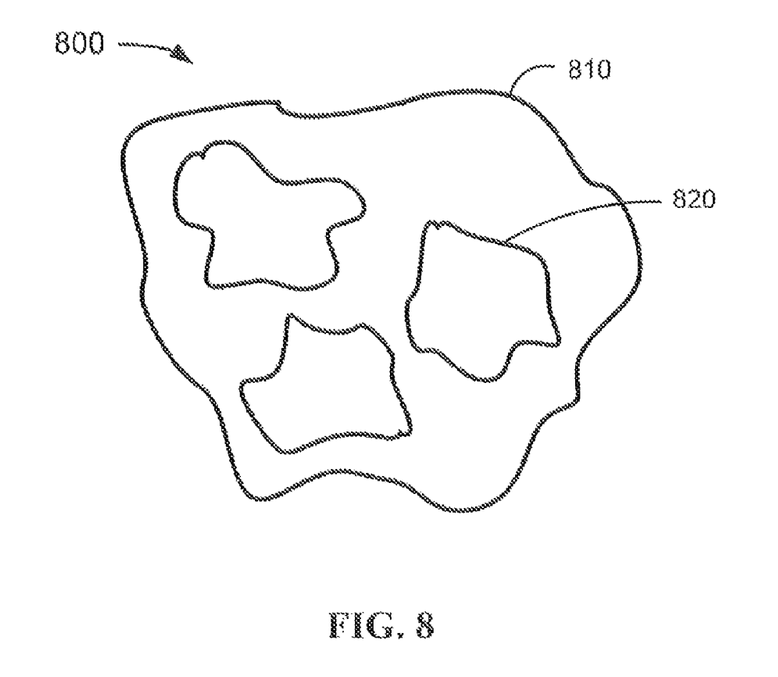
FIG. 8 shows a cross-section of an example composite matrix material having pores that can be filled with PCM.

In one embodiment, the PCM can be incorporated in a high thermal conductivity matrix, such as carbon fibers or graphite, where the matrix material is manufactured with a reasonably high porosity. FIG. 8 shows a cross-section of a piece of composite matrix 800. The high thermal conductivity matrix 810 has several pores 820. The pores 820 within the matrix 810 are under filled with PCM so that the matrix 810 provides a low resistance heat flow path to the PCM. The heat flow process is similar to the pelletized PCM, except that the conductive heat transfer path is through the low resistance matrix, while the PCM in the pores act as the energy storage medium. For example, for a porosity level of approximately 90%, such that the high thermal conductivity material only comprises about 10% of the volume, the thermal conductivity of the composite matrix can be more than 100 times higher than that of the liquid PCM alone. The composite matrix can either be housed in a thermally conductive container or coated and sealed with a high thermal conductivity material to prevent leakage of the PCM when it changes to the molten state.

Figure 9:
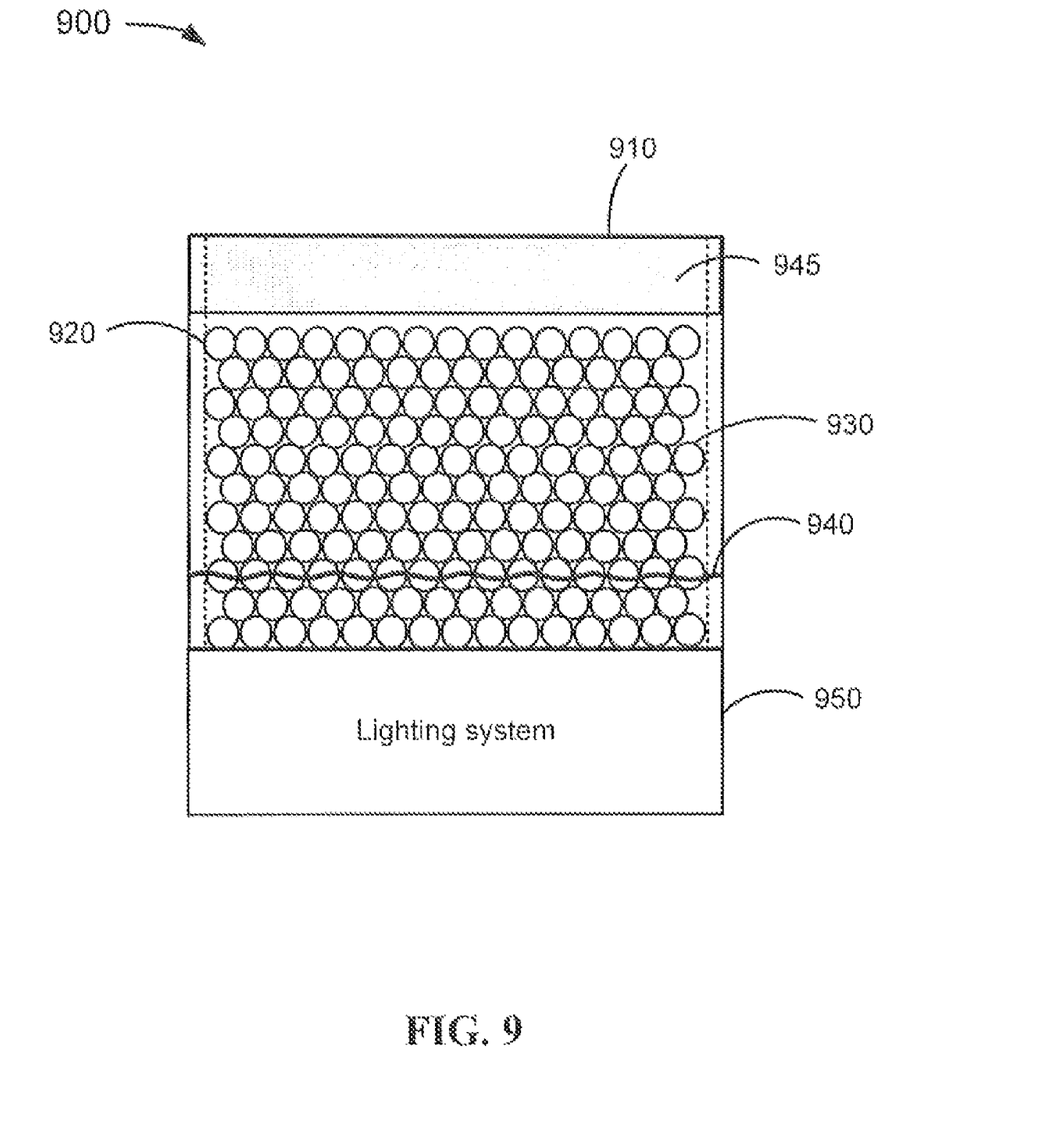
FIG. 9 depicts an example of a heat pipe filled with PCM capsules.

In one embodiment, a canister made from a high thermal conductivity material, for example aluminum, is used to enclose PCM capsules and can be configured as a heat pipe. As shown in FIG. 9, the canister 910 is filled at least partially with encapsulated PCM pellets 930 and a small amount of working liquid 940. The working liquid should be selected to match the desired operating temperature of the lighting system housing. Water can be suitable for operating temperatures in the temperature range from 30° to 1000°.

After the PCM pellets are added to the canister 910 and the air is evacuated, the working liquid can be added to the canister 910. The partial vacuum below the vapor pressure of water inside the canister ensures that there will be both liquid and gaseous water present. The liquid 940 sits at the base of the canister 910, and when sufficient heat is applied to the bottom of the canister from the lighting system 950 which is thermally coupled to the canister 910, the liquid 940 vaporizes, and the gas 945 flows to the cooler region at the top of the canister 910 where it condenses. The condensed liquid then falls back to the bottom of the canister under the force of gravity, or one or more optional wicks 920 can be used that moves the liquid back to the hot base through capillary action. In either case, the surface tension needs to be overcome in order to return the condensed liquid back to the hot bottom surface of the canister 910.

Figure 10:
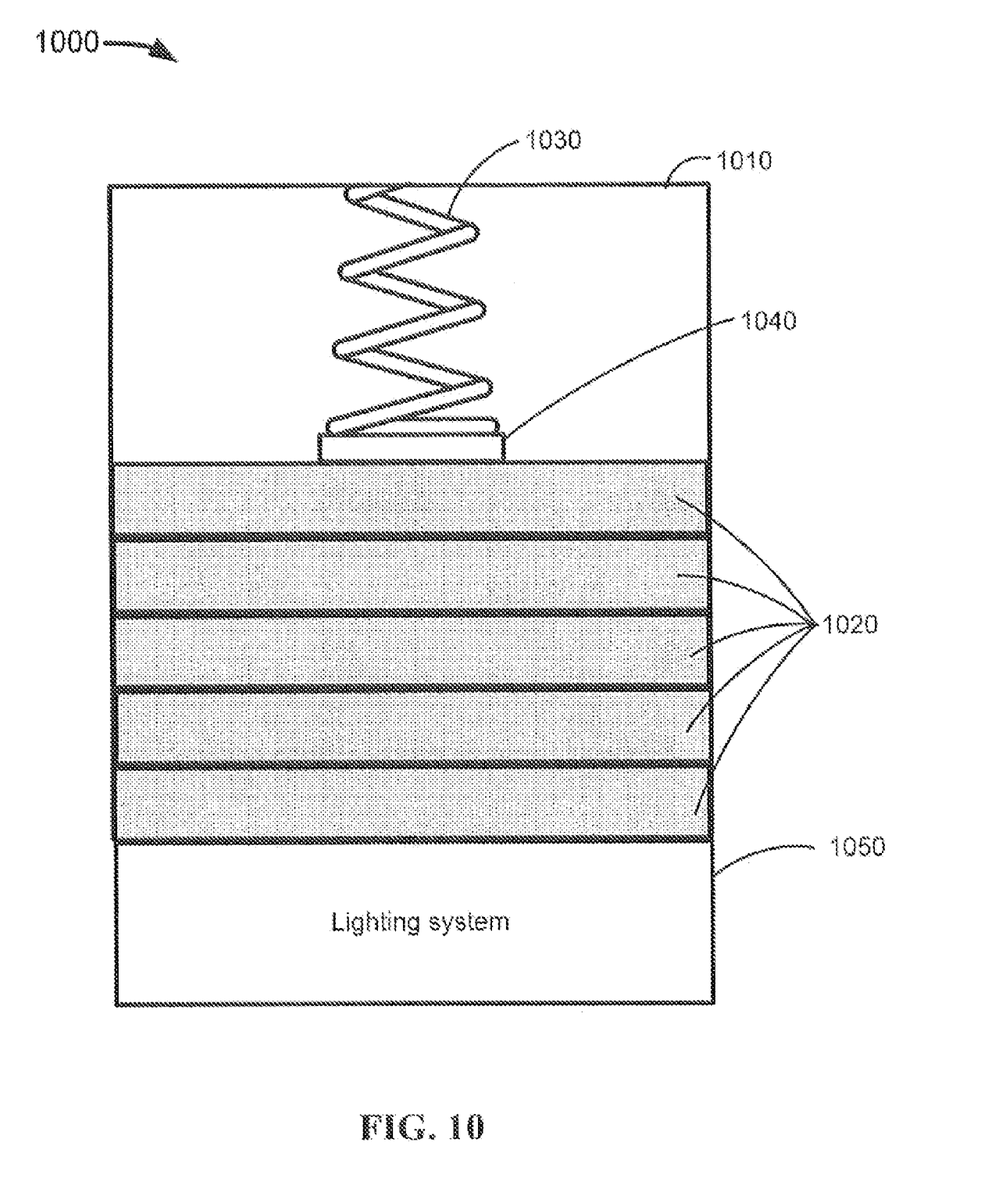
FIG. 10 depicts an example of PCM filled aluminum pouches preloaded against the bottom wall of a thermally conductive chamber.

In one embodiment, un-encapsulated PCM powder can be sealed in a non-rigid thermally conducting container. The container is not completely filled with the PCM powder and is non-rigid in order to accommodate volume changes of the PCM when the temperature changes. A non-limiting example of a non-rigid container is a square-shaped aluminum foil pouch, such as used for food manufacturing. However, any appropriately shaped pouch can be used. Many of the characteristics of the pouches used for storing food make them suitable for sealing in PCMs, for example, the pouches are strong, leak-proof, capable of being heated to 100° C. or above for cooking in boiling water and/or an oven, and capable of storing food for long periods of time. Moreover, common food manufacturing processes can be adapted for manufacturing pouches of PCM powder, such as building, filling, and sealing the pouch. The pouches can be made from two aluminum foil disks that are bonded together around the perimeter to form a leak-proof seal. PCM material under-fills each pouch prior to sealing to that when the PCM absorbs heat and changes from a solid to a liquid state, it has room to expand inside the pouch.

As shown in FIG. 10, multiple sealed pouches 1020 can be stacked vertically inside a PCM chamber 1010. The bottom of the chamber 1010 is coupled to a lighting system 1050 from which heat is generated. The pouches 1020 can be preloaded against the bottom hot wall of the chamber 1010 using a washer 1040 and spring 1030 system. The preloading keeps the pouches 1020 in contact with each other and with the hot bottom wall to provide an alternate conductive heat flow path as the PCM begins to melt. The spring preloading system should be designed with sufficient compliance to accommodate the expansion and contraction of the pouch height as the PCM changes phase from a solid to a liquid and vice versa. The PCM may be in powder form or in pelletized form within the pouches.

In one embodiment, a pouch container for PCM can be made in any shape including, but not limited to, strips or large areas such as a blanket. These custom-shaped pouches filled with PCM can be wrapped around or placed inside any type of device that has a constant temperature requirement, not just lighting devices.

The words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

The teachings of the invention provided herein can be applied to other systems, not necessarily the system described above. The elements and acts of the various embodiments described above can be combined to provide further embodiments.

While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

What is claimed is:

1. A thermal storage system for a lighting system, comprising:
   a phase change material (PCM) having a melting point temperature, the PCM being formed in pellets that are pelletized by encapsulating PCM in a high thermal conductivity material;
   a plurality of pouches wherein the PCM is disposed; and
   a container holding the plurality of pouches wherein the PCM is disposed, wherein the container is thermally conductive, sealed, and structurally arranged for thermal coupling to the lighting system.

2. The thermal storage system of claim 1 wherein the PCM is combined with a nucleating agent and/or a stabilizing agent.

3. A thermal storage system as recited in claim 1, wherein the pellets are partially filled with PCM.

4. A thermal storage system as recited in claim 1 further include a spring loading system disposed in the container, and wherein the plurality of pouches are preloaded against a surface of the container using the spring system.

5. A lighting system for providing illumination, the lighting system comprising:
   a housing including the following components:
   a lamp disposed within the housing, the lamp including a plurality of light emitting diodes (LEDs) and a lens, the plurality of LEDs having an optimum operating temperature;
   a container disposed within the housing, the container including pelletized phase change material (PCM) disposed in a plurality of pouches, the container being made of a non-corrosive thermally conductive material, the pelletized phase change material pellitized by encapsulating PCM in a high thermal conductivity material;
   a structure thermally coupling the lamp to the container;
   wherein the container and the PCM material and mass are selected according to thermal properties of the lighting system to effectively clamp operating temperature of the plurality of the LEDs to about the optimum operating temperature within a fixed duty cycle for the cyclical application.

6. A lighting system as recited in claim 5, further comprising a convective cooling element, wherein heat retained within the PCM during operation of the lighting system is useful for driving heat dissipation via the convective cooling element when the lighting system is not in operation.

7. A lighting system as recited in claim 5, wherein the PCM pellets are spherical having a diameter ranging from about 0.1 microns to about 1.0 microns.

8. A lighting system as recited in claim 5, wherein the encapsulating material is metallic and applied with a thickness of 0.1 microns or thinner.

\* \* \* \* \*